(12) United States Patent
Bjernetun et al.

(10) Patent No.: US 9,643,610 B2
(45) Date of Patent: May 9, 2017

(54) METHOD AND ARRANGEMENT FOR CONTROLLING AN AUTOMATIC TRANSMISSION UNIT

(71) Applicant: Volvo Truck Corporation, Göteborg (SE)

(72) Inventors: Johan Bjernetun, Mölnlycke (SE); Henrik Ryberg, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 146 days.

(21) Appl. No.: 14/683,171

(22) Filed: Apr. 10, 2015

(65) Prior Publication Data
US 2016/0297445 A1  Oct. 13, 2016

(51) Int. Cl.
| F16H 59/00 | (2006.01) |
| B60W 30/18 | (2012.01) |
| B60W 10/02 | (2006.01) |
| B60W 10/06 | (2006.01) |
| B60W 10/11 | (2012.01) |
| B60W 40/105 | (2012.01) |

(52) U.S. Cl.
CPC ...... *B60W 30/18072* (2013.01); *B60W 10/02* (2013.01); *B60W 10/06* (2013.01); *B60W 10/11* (2013.01); *B60W 30/18136* (2013.01); *B60W 40/105* (2013.01); *B60W 2030/1809* (2013.01); *B60W 2030/18081* (2013.01); *B60W 2520/10* (2013.01); *B60W 2710/025* (2013.01); *B60W 2710/0644* (2013.01)

(58) Field of Classification Search
CPC .................................................. F16H 2059/663
See application file for complete search history.

(56) References Cited

U.S. PATENT DOCUMENTS

| 4,961,484 | A | * | 10/1990 | Kato | ...................... | F16H 61/21 |
| | | | | | | 192/3.3 |
| 5,816,979 | A | * | 10/1998 | Shiiba | .................. | F16H 61/143 |
| | | | | | | 477/174 |
| 6,231,480 | B1 | * | 5/2001 | Sasaki | ..................... | F16H 61/21 |
| | | | | | | 192/3.29 |
| 2013/0118855 | A1 | | 5/2013 | Hwang et al. | | |

FOREIGN PATENT DOCUMENTS

| EP | 2269882 A2 | 1/2011 |
| WO | 2011015430 A1 | 2/2011 |
| WO | 2013104617 A1 | 7/2013 |

* cited by examiner

*Primary Examiner* — Tisha Lewis
(74) *Attorney, Agent, or Firm* — WRB-IP LLP

(57) ABSTRACT

A method is provided for controlling an automatic transmission unit including at least a transmission with different selectable gear ratios and a clutch and being associated with a propulsion unit for a vehicle. The method includes operating the vehicle at a prevailing vehicle speed (v) in a downslope with the automatic transmission unit in a neutral gear or disengaged from the propulsion unit; operating the propulsion unit in an idle mode of operation; controlling the automatic transmission unit so as to select a gear which is a relatively low gear with regard to the prevailing vehicle speed (v), while maintaining the automatic transmission unit in a neutral gear or disengaged from the propulsion unit; and engaging the clutch to be slipping between the propulsion unit and the automatic transmission unit in order to adapt the rotational speed of the propulsion unit to the gear ratio of the relatively low gear.

13 Claims, 3 Drawing Sheets

METHOD AND ARRANGEMENT FOR CONTROLLING AN AUTOMATIC TRANSMISSION UNIT

BACKGROUND AND SUMMARY

The present invention relates to a method for controlling an automatic transmission unit comprising at least a transmission with different selectable gear ratios and a clutch and being associated with a propulsion unit for a vehicle.

The invention also relates to an arrangement for controlling an automatic transmission unit comprising at least a transmission with different selectable gear ratios and a clutch and being associated with a propulsion unit for a vehicle.

In the field of vehicles, for example heavy commercial vehicles, there is a constant requirement to minimize the fuel consumption. To a certain extent, this requirement can be achieved by means of today's sophisticated fuel control systems, in which injection of fuel to the vehicle's engine is determined based on a number of operating parameters such as the throttle position, coolant temperature, camshaft position and oxygen level in the exhaust system. These parameters are used for determining the necessary output power of the engine, which also controls the required amount of fuel to be injected into the engine.

In the case of a heavy transport vehicle which is equipped with an automatic transmission unit, it is known that said unit is configured for shifting by means of a transmission control unit which is arranged in order to select a suitable gear during driving. In this manner, torque will be transmitted from the vehicle's engine to the drive wheels.

During driving conditions where the vehicle is operating at zero throttle and while the vehicle is still in motion, the transmission can be configured to disengage the gears and allow the vehicle to enter a freewheeling mode, i.e. with the transmission being disconnected from the engine. During this freewheeling mode, the kinetic energy of the vehicle will cause the vehicle to move. If no engine brake is used, the fuel consumption can be minimized during such operating conditions.

A typical example of a situation when fuel consumption can be minimized is during driving on a downhill road section. During such a situation, the fuel injection to the engine can be cut off completely during a freewheeling mode while the vehicle is rolling and maintaining its speed without being assisted by the engine and without any application of the accelerator pedal by the driver. As mentioned, this is beneficial for the fuel consumption of the vehicle.

The term "freewheeling" (also known as "coasting") is consequently used to describe operation of a vehicle with the transmission being disconnected from the engine. Generally, this may be achieved either by selecting a neutral gear in the transmission or by actuating a clutch.

Furthermore, cruise control operation is often used during driving with heavy transport vehicles having an automatic transmission. During such operation, a suitable cruising speed is set by the driver. If the vehicle should come to a downhill section of a road, the transmission may enter a freewheeling mode. Due to the fact that the vehicle is rolling downhill, its speed will increase gradually. If no other braking is applied during this situation, the vehicle will eventually reach a so-called braking speed, i.e. a speed at which the cruise control system must prevent the speed of the vehicle from increasing further by braking the vehicle. According to known technology, such braking can be provided by means of engine braking. Normally, this is obtained by re-engaging a gear in the transmission. In order to engage the gear, the speed of the input shaft to the transmission must be accelerated to be adapted to the new gear. This increased speed is normally carried out by injecting fuel into the engine. The amount of fuel depends on the difference in speed that needs to be overcome by acceleration of the input shaft.

Consequently, a problem with the above-mentioned approach is that fuel injection is actually carried out during engine braking, due to the process of increasing the speed of the engine while braking during downhill conditions. This is not beneficial for the vehicle's overall fuel consumption.

Consequently, although the method above constitutes a suitable way of braking the vehicle it also contributes to a relatively high fuel consumption during the engagement of the newly selected gear.

The patent document WO 2013/104617 teaches a method in a vehicle for reducing fuel consumption during freewheeling. More precisely, this document teaches a step of detecting a condition involving freewheeling and a step of controlling a slip device (for example a friction clutch or a torque converter) for coupling the engine and the transmission. In this manner, the engine speed can be maintained at a control speed by increasing the engine speed to match transmission speed according to the normal control parameters of the transmission.

Consequently, although there exist previously known solutions for decreasing fuel consumption, i.e. at a freewheeling condition during downslope, there is still a general need to further reduce the fuel consumption.

It is desirable to provide an improved method and arrangement for controlling an automatic transmission unit by means of which the fuel consumption of a vehicle can be minimized, in particular during driving on a downhill road section.

In accordance with an aspect of the invention, a method is provided for controlling an automatic transmission unit comprising at least a transmission with different selectable gear ratios and a clutch and being associated with a propulsion unit for a vehicle. The method comprises the following steps: operating said vehicle at a prevailing vehicle speed in a downslope with said automatic transmission unit in a neutral gear or disengaged from said propulsion unit; operating said propulsion unit in an idle mode of operation; controlling said automatic transmission unit so as to select a gear which is a relatively low gear with regard to said prevailing vehicle speed, while maintaining said automatic transmission unit in a neutral gear or disengaged from said propulsion unit; and engaging said clutch to be slipping between the propulsion unit and the automatic transmission unit in order to adapt the rotational speed of the propulsion unit to the gear ratio of said relatively low gear.

By means of the invention, certain advantages are obtained. Most importantly, the invention leads to an improvement of fuel consumption due to the fact that the engine speed does not have to be increased in connection with braking of the vehicle during downhill freewheeling conditions. Consequently, fuel consumption is minimized.

According to an aspect, the step of engaging said clutch is automatically activated when the prevailing vehicle speed of the vehicle is estimated to have reached a braking limit speed of said vehicle. Also, the clutch is suitably controlled for obtaining an optimal increase of speed of the propulsion unit in order to limit the heat energy developed in the clutch to a predetermined value.

According to another aspect of the invention, an arrangement is provided for controlling an automatic transmission unit comprising at least a transmission with different selectable gear ratios and a clutch and being associated with a propulsion unit for a vehicle. The arrangement comprises a control unit connected to said propulsion unit and said automatic transmission unit, said control unit being configured for operating said vehicle at a prevailing vehicle speed in a downslope with said automatic transmission unit in a neutral gear or disengaged from said propulsion unit; for operating said propulsion unit in an idle mode of operation; and for controlling said automatic transmission unit so as to select a gear which is a relatively low gear with regard to said prevailing vehicle speed, while maintaining said automatic transmission unit in a neutral gear or disengaged from said propulsion unit; wherein said control unit is also configured for engaging said clutch to be slipping between the propulsion unit and the automatic transmission unit in order to adapt the rotational speed of the propulsion unit to the gear ratio of said relatively low gear.

According to embodiments, the automatic transmission unit is a dual-clutch transmission unit or alternatively a single-clutch transmission unit.

The invention is particularly adapted for being used in heavy commercial vehicles but can be used in generally any vehicle with a controllable automatic transmission unit in which there is a need for minimizing fuel consumption.

BRIEF DESCRIPTION OF DRAWINGS

The invention will now be described with reference to an embodiment and with reference to the appended drawings, wherein.

DETAILED DESCRIPTION

Figure 1:
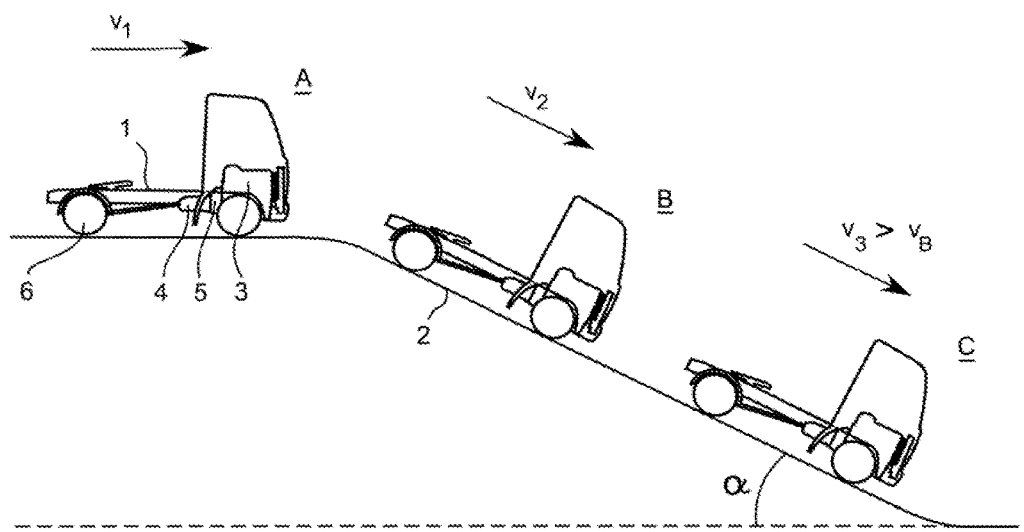
FIG. 1 shows a simplified view of a vehicle driving in a downhill road, in order to explain the principles of the invention.

Different aspects of the present disclosure will be described more fully hereinafter with reference to the accompanying drawings. The arrangement disclosed below can, however, be realized in many different forms and should not be construed as being limited to the aspects set forth herein.

Initially, the principles of the invention will be explained with reference to FIG. 1, which shows in a simplified manner a heavy transport vehicle 1 which is just about to arrive at a downslope 2, i.e. a downhill road section. In a conventional manner, the vehicle 1 is provided with a propulsion unit 3 and a transmission unit 4. For the purposes of this disclosure, the propulsion unit 3 is a conventional combustion engine (for example a diesel engine) or a hybrid arrangement comprising both a combustion engine and an electric motor. The propulsion unit 3 and the transmission unit 4 are connected via a clutch 5.

Furthermore, the transmission unit 4 is an automatic transmission of generally conventional type, i.e. in the form of an automated manual transmission (AMT) or alternatively a regular automatic transmission. The transmission unit 4 is configured with a freewheeling function which allows the vehicle to be operated in a freewheeling condition during certain predetermined operating conditions. As explained initially, the purpose of the freewheeling operation is to reduce the fuel consumption of the vehicle 1, for example during driving in a downslope.

In a manner which is known as such, the propulsion unit 3 has an output shaft (not shown) which is connected to the transmission unit 4 via the clutch 5 so as to define a drive train for the vehicle 1. The drive train is connected to the driven wheels of the vehicle 1, for example the rear wheels 6. As is commonly known, the transmission unit 4 is arranged for a gear ratio change between the propulsion unit 3 and the driven wheels 6 through a suitable selection of a gear.

As will be described in greater detail below, the clutch 5 is suitably of the dual clutch type, i.e. a type of clutch which is previously known as such and which comprises two clutch components connected to a crankshaft of the engine 3. From the clutch 5, two input shafts are connected to the actual transmission. The main purpose of a dual clutch is to allow a first gear to be in operation while a second gear is prepared and selected for a later shifting operation, i.e. so that the second gear can be connected at the same time as the first gear is disconnected during said shifting operation. This allows gear changes to be performed without any interruption in power delivery from the engine.

Although the principles of the invention are particularly useful for use with a dual clutch, it should be noted that the invention is not limited to a dual clutch arrangement only, but can be used also with conventional single-clutch transmission arrangements also.

As will be explained in greater detail below, the vehicle 1 is equipped with a cruise control function, which is known as such and which can be configured so as to comprise a freewheeling function depending on driver input and other operating conditions of the vehicle 1.

With reference to FIG. 1, it is assumed that the vehicle 1 is travelling at a particular vehicle speed as indicated with $v_1$. This speed corresponds to a set speed $v_1$ of the cruise control function of the vehicle 1. For the purpose of describing the function of the invention, the vehicle 1 can be said to be in a first position A, as indicated in FIG. 1. This position corresponds to a situation just before the vehicle 1 is about to arrive at the downslope 2, i.e. a road section which has a certain inclination with reference to a horizontal line, as indicated with the reference symbol $\alpha$ in FIG. 1, indicating an angle of inclination. It is also assumed that the vehicle 1 has a certain mass m and that it moves with a certain acceleration a. As will be described, it should be noted that information such as the inclination $\alpha$, the mass m and the acceleration a can be used in order to determine whether it is suitable for the vehicle 1 to enter the above-mentioned freewheeling condition.

It is here assumed that the cruise control system has been set so that the vehicle 1 travels with a set speed $v_1$ in the first position A in FIG. 1. When the vehicle 1 has moved further along the downslope 2 and has reached a second position B, it can be expected that it has reached a speed $v_2$ which is higher than the initially set speed $v_1$ if no braking has occurred.

It can be assumed that the vehicle 1 can enter said freewheeling condition at the second position B. The principles of initiating the freewheeling mode are as follows. When the propulsion unit 3 is in its drive mode, a gear is selected and torque is transmitted from the crankshaft to the drive wheels 6. However, when the vehicle 1 starts to roll down the downslope 2 and there is no fuel demand from the cruise control system in order to maintain the set speed $v_1$, it can be assumed that the transmission can be disengaged so that the vehicle enters the freewheeling mode without any engine brake being applied. Consequently, during freewheeling the transmission 4 is disconnected from the engine 3, no throttle is applied and no fuel is injected to the engine 3. Suitably, the speed of the engine 3 is maintained generally at idling speed, but with no fuel injection. This means that the kinetic energy of the vehicle causes the vehicle to move forwards and no fuel needs to be injected into the engine. As mentioned initially, this will result in a lower fuel consumption than if engine braking was applied.

According to known technology, the freewheeling condition can be initiated as a result of certain predetermined driving conditions being detected. Such conditions can be that the vehicle is travelling downhill (which can be detected by means of a tilt sensor for sensing the inclination α of the road) and for activating the freewheeling mode of operation if the downslope 2 inclination α exceeds a predetermined threshold value. Furthermore, information related to the vehicle's 1 acceleration a, speed v and other information such as whether there is a demand for fuel injection from the cruise control system or the accelerator pedal, can be used for deciding whether the freewheeling mode should be activated.

In summary, at position B as shown in FIG. 1, it is assumed that the vehicle 1 is moving with a speed $v_2$ which is higher than the initially set speed $v_1$, and that the freewheeling operation is active.

If the actual speed becomes higher than a predetermined braking speed, i.e. if the speed $v_3$ in position C becomes higher than a certain braking speed $v_B$, i.e. a highest allowed speed at which the cruise control function is configured to actuate some form of braking function in order to decrease the vehicle speed, the following measures are taken. First, it is determined that a braking function must be initiated. According to an embodiment, the speed v of the vehicle 1 can be used as a single parameter for deciding that this braking function should be initiated, but according to further embodiments, several more parameters may be taken into account for such a decision. Suitably, the following parameters can be taken into account: the vehicle speed v, the road inclination α, the vehicle mass m and the vehicle acceleration a, and optionally also further driver input, for example in the form of signal from a brake pedal actuator, an accelerator pedal actuator or similar information.

Since braking is about to be initiated, the next step is that a gear is prepared so as to be selected in the transmission unit 4. It is an important feature of the invention that a lower gear than the used gear (i.e. the gear which was in use when freewheeling was activated) can be selected and gradually engaged in order to decrease the vehicle speed v. During normal downslope driving, the currently used gear can be for example gear number 12 (assuming that the transmission has 12 gears).

According to the embodiment, the new gear which is prepared is gear number 11, or possibly gear number 10. This lower gear corresponds to an engine speed which causes engine braking, i.e. corresponding to a vehicle speed v which is lower than the current vehicle speed $v_2$. More precisely, the new gear is a relatively low gear in the sense that it is chosen as a gear which is associated with an engine speed which in turn gives a sufficient braking power for the vehicle 1 while driving along the downslope 2.

The next step is that the new gear is re-engaged in the transmission 4. The clutch 5 is then gradually released so that the new gear is gradually engaged and slipping with the clutch 5. In this manner, engine braking is applied gradually without any fuel injection being necessary during the step of engaging the new gear. This is beneficial for the total fuel consumption of the vehicle 1.

Figure 2:
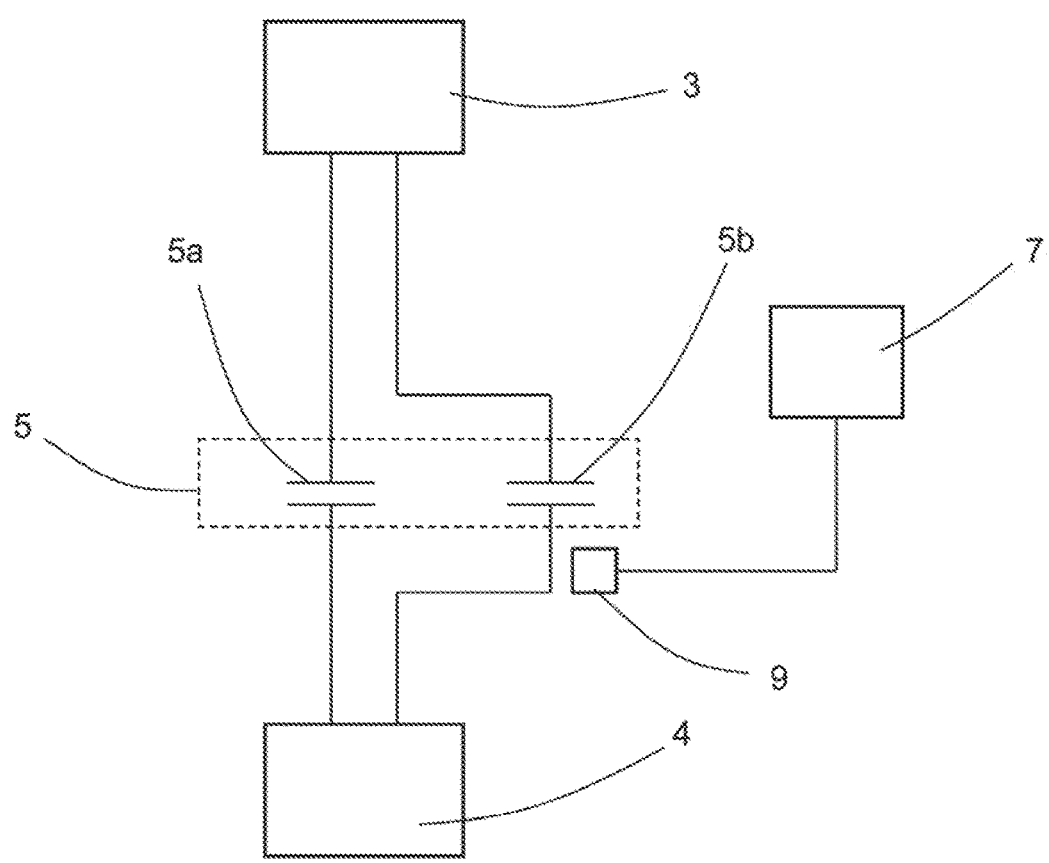
FIG. 2 is a schedule of the main components of a system in accordance with the principles of the invention; an FIG. 3 is a flowchart showing the principles of the invention.

With reference to FIG. 2, which is a simplified drawing of an arrangement according to the invention, there is shown an engine 3 which is connected to a transmission unit 4 via a clutch 5. The transmission unit 4 is connected to a transmission control unit 7 which is arranged for controlling the operation of the transmission unit 4 and the clutch 5 based on certain information as will be described below. As mentioned, the clutch 5 is preferably of the dual-clutch type as shown in a schematic manner in FIG. 2. Accordingly, the clutch 5 comprises a first clutch mechanism 5a and a second clutch mechanism 5b. The first clutch mechanism 5a is associated with an active gear, which according to the example described with reference to FIG. 1 can be gear number 12. This corresponds to a situation where the vehicle is just about to approach the downslope 2 with a prevailing speed $v_1$, i.e. position A in FIG. 1.

Furthermore, the transmission control unit 7 is configured for detecting that the vehicle is rolling down the downslope 2 and for initiating a freewheeling mode in which the transmission unit 4 is disengaged from the engine 3, as previously described.

When the transmission control unit 7 senses that the actual speed $v_3$ of the vehicle 1 in position C has reached the predetermined braking speed $v_B$, which is also higher than the initial speed $v_1$, the transmission control unit 7 is configured for controlling the transmission unit 4 so as to first select a gear in the transmission unit 4 which is a relatively low gear with regard to said prevailing speed $v_3$ in position C, while maintaining the transmission unit 4 in a neutral gear or disengaged from the engine 1. In a typical situation, wherein the transmission unit 4 and the first clutch mechanism 5a are activated for gear number 12, the second clutch mechanism 5b is prepared to activate gear number 11.

In the context of the present disclosure, the term "relatively low gear" refers to a gear which is selected so as to provide sufficient engine braking power for the vehicle 1, i.e. assuming that the vehicle 1 does not accelerate further when driving along the downslope 2. Another way of defining the term "relatively low gear" according to the disclosure is a gear which is associated with a certain engine speed—after selecting the gear—which gives a predetermined, suitable engine braking power to be used for braking the vehicle 1 while driving along the downslope 2. The specific choice of gear to be chosen in a particular situation may depend on various parameters, for example the inclination of the downslope, the vehicle speed and acceleration etc., and can be defined and stored in a table in the transmission control unit 7. Consequently, such a table is based on pre-stored information related to various vehicle parameters.

Finally, in order to provide the actual engine braking, the second clutch mechanism 5b is engaged, by means of the transmission control unit 7, to be slipping between the engine 3 and the transmission unit 4 gradually actuates the second clutch mechanism 5b. The first clutch mechanism 5a can suitably be coupled to a neutral gear.

In this manner, the rotational speed of the engine 3 will be adapted to the gear ratio of the relatively low gear. This means in principle also that the engine speed will be adapted to the inertia of the vehicle 1. Consequently, the relatively low gear will be active, and will gradually brake the vehicle, however without any fuel having to be injected into the engine 3 at this stage. In other words, this causes an engine brake function without the disadvantages of the prior art, i.e. wherein the engine shaft must be accelerated, which requires fuel injection.

According to an embodiment, the step of selecting the relatively low gear is carried out by gradually releasing the clutch 5 so that the gear in question is gradually engaged and slipping with the clutch 5. In this manner, engine braking is applied gradually without any fuel injection being necessary during the step of engaging the new gear. This is beneficial for the total fuel consumption of the vehicle 1.

According to an embodiment, the gear selected for the engine braking function can be adapted depending on the amount of engine braking which is needed, i.e. to the vehicle speed which is required after braking has occurred. Alternatively, the gear to be selected can be adapted to the inclination of the downslope 2, since a relatively steep downslope can be expected to require a higher braking effect than a downslope which is less steep.

According to an aspect, the transmission unit 4 is of the type which is connected to a dual-clutch, as explained with reference to FIG. 3. However, according to a further embodiment (not shown in the drawings), the transmission unit may be associated with a single-clutch device. In such case, it can be expected that the transmission unit is in a neutral condition during freewheeling. If the vehicle braking speed has been reached and engine braking is needed, the single-clutch must first be disengaged. Next, a synchronization must be carried out in the transmission unit before the next, relatively low, gear is selected. Next, the clutch is gradually engaged—generally as described above with reference to the dual-clutch—in order to provide a slip function but without having to inject any fuel into the engine.

Figure 3:
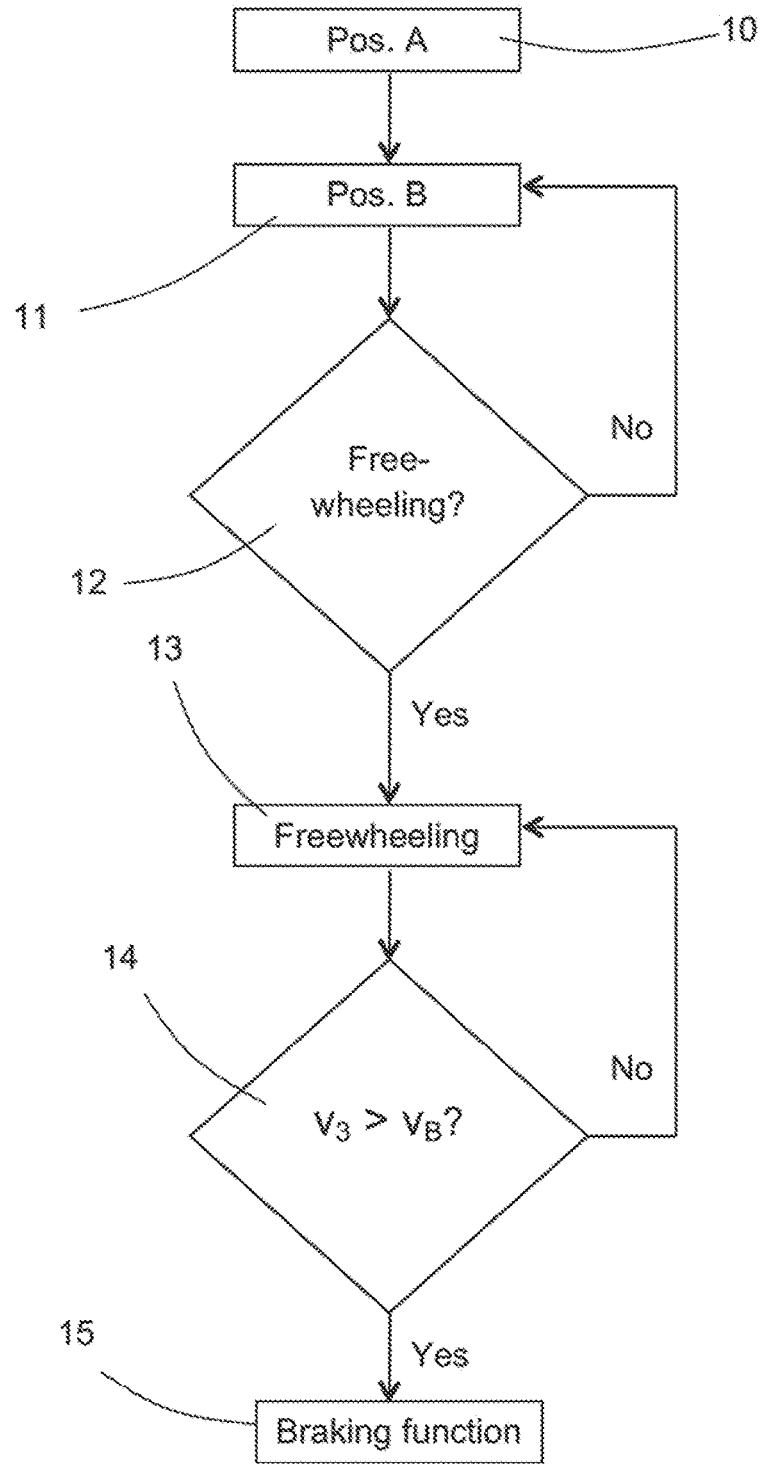

FIG. 3 is a simplified flow chart showing the operation of the invention. The step indicated with reference numeral 10 refers to the situation in which the vehicle 1 is travelling with a speed $v_1$ as indicated at position A in FIG. 1. Next, the vehicle 1 enters the downslope 2 and soon reaches position B having a speed $v_2$ (step 11 in FIG. 3). Next, it is decided whether the proper conditions for initiating freewheeling of the vehicle 1 are fulfilled (step 12). If this is the case, as described above, the freewheeling mode of operation is entered (step 13), after which it is decided whether the vehicle speed $v_3$ in position C exceeds the cruise control brake speed $v_B$ (step 14). If this is the case, the braking function according as described above is activated by gradually engaging a lower gear without any fuel injection to the vehicle engine (step 15). This step (15) of slipping with the clutch 5 while engaging a suitable gear for engine braking is carried out by means of the transmission control unit 7 as shown in FIG. 2 and as described above.

According to alternative embodiments, the freewheeling can be carried out either by means of a clutch which is closed to a neutral gear or a clutch which is open to a gear, and can be selected by means of pre-stored information (related to the vehicle operation) determining which alternative is the most suitable in a given scenario.

According to an embodiment, the input parameters which are suitable for the above-mentioned steps are the vehicle speed, the vehicle acceleration, the vehicle weight and the road slope inclination. Also, possible driver input can also be taken into account, such as signals from a brake pedal actuator and an accelerator pedal actuator. Furthermore, the output signals which are suitable are signals corresponding to the engine speed (i.e. in order to control the actual speed of the engine), the clutch position for each one of the clutch mechanisms 5*a*, 5*b* and a gear selection signal to the transmission unit 4.

The invention is not limited to the embodiments described above, but can be varied within the scope of the subsequent claims. For example, the invention can be used for any type of vehicle having an automatic transmission unit and in which there is a possibility of activating a freewheeling type of operation.

The invention claimed is:

1. Method for controlling an automatic transmission unit comprising at least a transmission with different selectable gear ratios and a clutch and being associated with a propulsion unit for a vehicle; the method comprising the following steps:
   operating the vehicle at a prevailing vehicle speed in a downslope with the automatic transmission unit in a neutral gear or disengaged from the propulsion unit;
   operating the propulsion unit in an idle mode of operation;
   controlling the automatic transmission unit so as to select a gear which is a relatively low gear with regard to the prevailing vehicle speed, while maintaining the automatic transmission unit in a neutral gear or disengaged from the propulsion unit; and
   engaging the clutch to be slipping between the propulsion unit and the automatic transmission unit in order to adapt the rotational speed of the propulsion unit to the gear ratio of the relatively low gear, wherein the step of engaging the clutch is automatically activated when the prevailing vehicle speed of the vehicle is estimated to have reached a braking limit speed of the vehicle.

2. Method according to claim 1, wherein the relatively low gear is constituted by a gear which corresponds to a speed of the propulsion unit which provides a predetermined braking power for the vehicle during operation in the downslope.

3. Method according to claim 1, wherein the clutch is controlled for obtaining an increase of speed of the propulsion unit which is selected in order to limit the heat energy developed in the clutch to a predetermined value or for obtaining a sufficient level of comfort during operation of the vehicle.

4. Method according claim 1, wherein the step of engaging the clutch is carried out without any injection of fuel to the propulsion unit.

5. Method according to claim 1, wherein the step of selecting the relatively low gear is carried out by gradually releasing the clutch so that the gear is gradually engaged and slipping with the clutch.

6. Arrangement for controlling an automatic transmission unit comprising at least a transmission with different selectable gear ratios and a clutch and being associated with a propulsion unit for a vehicle; the arrangement comprising a control unit connected to the propulsion unit and the automatic transmission unit, the control unit being configured for operating the vehicle at a prevailing vehicle speed in a downslope with the automatic transmission unit in a neutral gear or disengaged from the propulsion unit; for operating the propulsion unit in an idle mode of operation; and for controlling the automatic transmission unit so as to select a gear which is a relatively low gear with regard to the prevailing vehicle speed, while maintaining the automatic transmission unit in a neutral gear or disengaged from the propulsion unit; wherein the control unit is also configured for engaging the clutch to be slipping between the propulsion unit and the automatic transmission unit in order to adapt the rotational speed of the propulsion unit to the gear ratio of the relatively low gear, wherein the control unit is configured for determining whether a braking limit speed of the vehicle has been reached, and for automatically engaging the clutch when the braking limit speed of the vehicle has been reached.

7. Arrangement according to claim 6, wherein the control unit is configured for selecting the relatively low gear as a gear which corresponds to a speed of the propulsion unit which provides a predetermined braking power for the vehicle during operation in the downslope.

8. Arrangement according to claim 6, wherein the clutch is controlled for limiting the heat energy developed in the clutch to a predetermined value or for obtaining a sufficient level of comfort during operation of the vehicle.

9. Arrangement according to claim 6, wherein the automatic transmission unit is a dual-clutch transmission unit.

10. Arrangement according to claim 6, wherein the automatic transmission unit is a single-clutch transmission unit.

11. Vehicle comprising an arrangement for controlling an automatic transmission unit comprising at least a transmission with different selectable gear ratios and a clutch and being associated with a propulsion unit for a vehicle; the arrangement comprising a control unit connected to the propulsion unit and the automatic transmission unit, the control unit being configured for operating the vehicle at a prevailing vehicle speed in a downslope with the automatic transmission unit in a neutral gear or disengaged from the propulsion unit; for operating the propulsion unit in an idle mode of operation; and for controlling the automatic transmission unit so as to select a gear which is a relatively low gear with regard to the prevailing vehicle speed, while maintaining the automatic transmission unit in a neutral gear or disengaged from the propulsion unit; wherein the control unit is also configured for engaging the clutch to be slipping between the propulsion unit and the automatic transmission unit in order to adapt the rotational speed of the propulsion unit to the tear ratio of the relatively low gear, wherein the control unit is configured for determining whether a braking limit speed of the vehicle has been reached, and for automatically engaging the clutch when the braking limit speed of the vehicle has been reached.

12. A computer comprising a program for performing the steps of claim 1.

13. A non-transitory computer readable medium carrying a computer program for performing the steps of claim 1 when the program is run on a computer.

* * * * *